March 15, 1955  H. S. RAINBOW  2,704,136
RETRACTABLE DEBRIS GUARD

Filed May 27, 1952  4 Sheets-Sheet 1

INVENTOR
H. S. RAINBOW
BY Mawhinney & Mawhinney
ATTYS.

March 15, 1955 — H. S. RAINBOW — 2,704,136
RETRACTABLE DEBRIS GUARD
Filed May 27, 1952 — 4 Sheets-Sheet 2

INVENTOR
H. S. RAINBOW
BY Mawhinney & Mawhinney
ATTYS.

March 15, 1955 H. S. RAINBOW 2,704,136
RETRACTABLE DEBRIS GUARD
Filed May 27, 1952 4 Sheets-Sheet 3

INVENTOR
H. S. RAINBOW
BY Mawhinney & Mawhinney
ATTYS.

March 15, 1955   H. S. RAINBOW   2,704,136
RETRACTABLE DEBRIS GUARD
Filed May 27, 1952   4 Sheets-Sheet 4
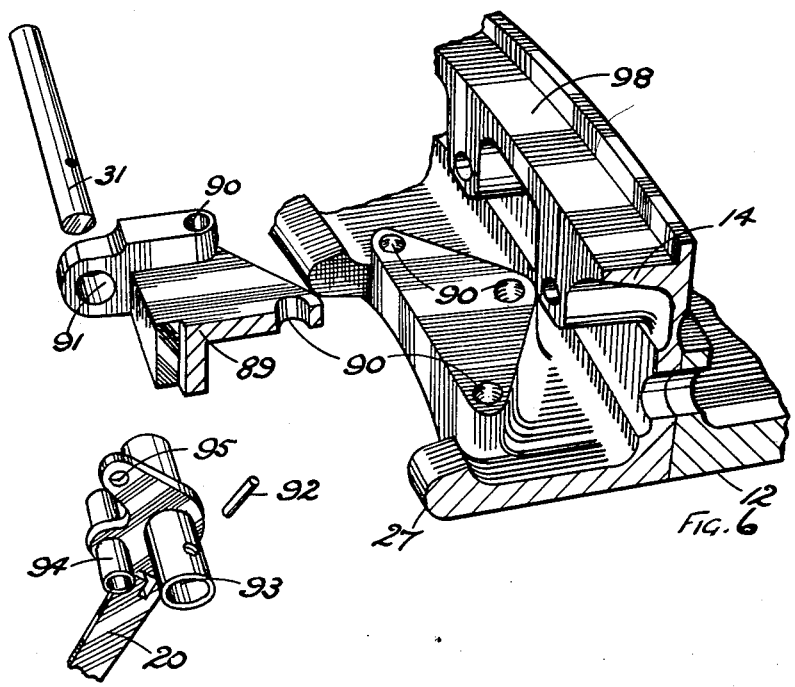
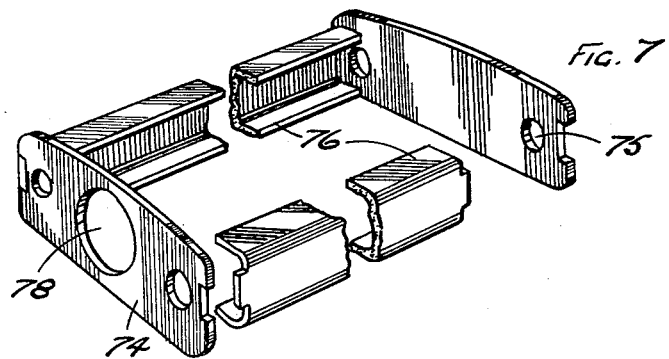
INVENTOR
H. S. RAINBOW

United States Patent Office

2,704,136
RETRACTABLE DEBRIS GUARD

Horace S. Rainbow, Coventry, England, assignor to Armstrong Siddeley Motors Limited, Coventry, England Application May 27, 1952, Serial No. 290,197

Claims priority, application Great Britain June 5, 1951

3 Claims. (Cl. 183—62)

Aircraft engines, particularly gas turbine engines incorporating axial flow compressors, are liable to damage by the ingress of foreign matter through the air intakes and it is advisable to provide some form of guard to prevent this.

A fixed type of guard, while it can be effective for the purpose, has the disadvantage that it forms a continuous drag and is prone to ice up quickly. In an effort to avoid these defects, guards have been proposed which have been movable into and from an operative position as desired. Such guards have been so designed that, when in the operative position, the guard surfaces constitute an inclined grid-like structure which, when any foreign matter strikes it, tends to deflect the matter rearwardly and outwardly into an appropriately placed collecting chamber.

The present invention is concerned with such retractable guards, whether directly applied to an annular air intake of an engine or to a duct in the aircraft leading to the engine air intake. Its main objects are to provide improvements in the operating mechanism, particularly to avoid shock at the ends of the opening or closing movements of the guard, and to ensure in a simple manner that the guard is normally positively maintained in the position to which it was last moved, independently of the actuating mechanism.

According to the main feature of the invention, a guarding device (i. e., a complete guard, or a section thereof) is movable into and from its operative position by a lever means operated by a fluid-actuated mechanism having flow control means adapted to reduce the speed of movement of the guarding portion as it approaches its extremity of travel in either direction.

In the accompanying drawings:

Figures 6 and 7 are fragmentary perspective views of some of the parts shown in Figure 5, detached from one another;

Figure 2:
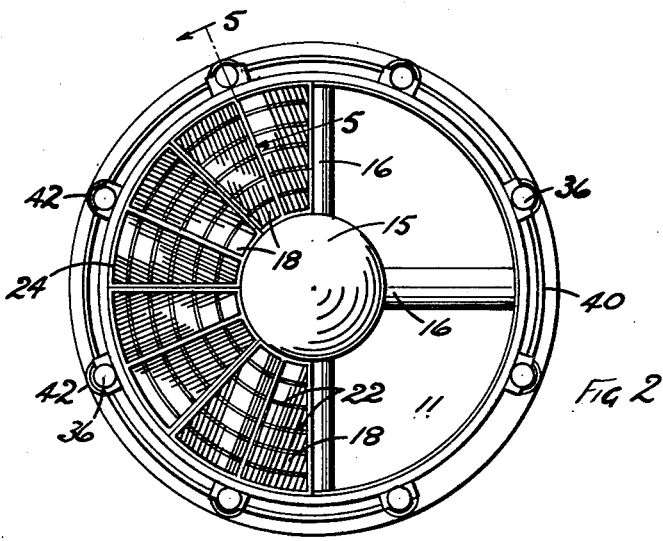
Figure 2 is a front elevation of the intake end showing four of the guard sections in the guarding position, the other four not being shown.
Figure 1:
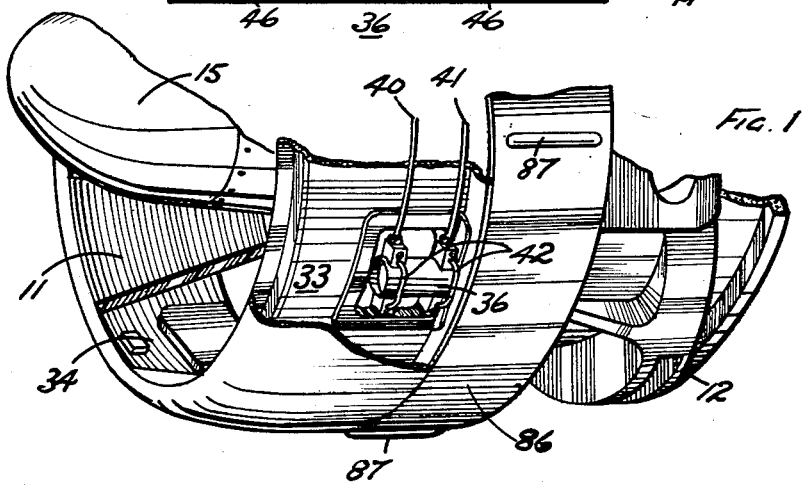
Figure 1 is a fragmentary perspective view of the intake end of the axial-flow compressor of a gas turbine engine provided with a debris guard according to the invention.
Figure 5:
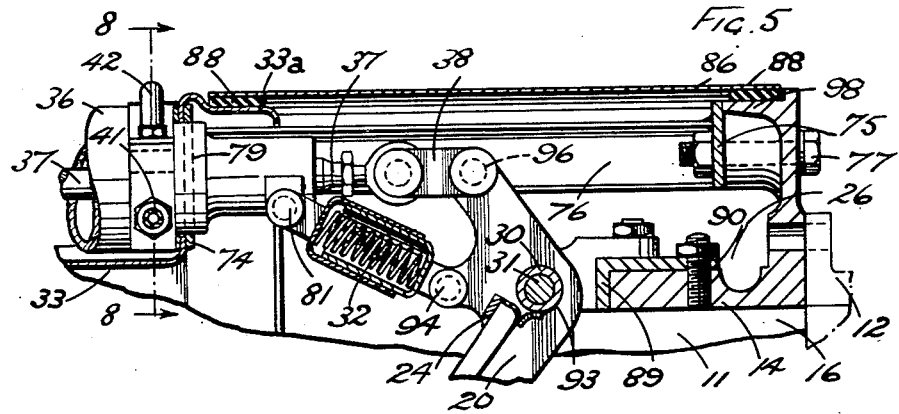
Figure 5 is a sectional elevation, to a larger scale and taken on the line 5—5 of Figure 2, of the supporting structure for the outer end of the lever means of one of the guard sections, and of the fluid-actuating mechanism and the independent retaining means therefor.

As stated, Figure 1 shows part of the intake end, i. e., part of the annular passage 11, of an axial-flow compressor, part of the casing of which is indicated at 12, of a gas turbine engine. As shown by Figures 2 and 5, that part of the annular passage 11 adjacent the casing 12 comprises an annular casing 14 and a central fairing member 15, which are connected by four radial webs 16 (Figure 5), one of these being shown fully in Figure 2 and two of them being shown partially. The fourth is obscured. The annular passage 11 forwardly of the casing 14 is guarded by means of a plurality of generally trapezoidal sections 18, four of these being shown in Figure 2 as covering the left half, while the other four are not shown.

Figure 3:
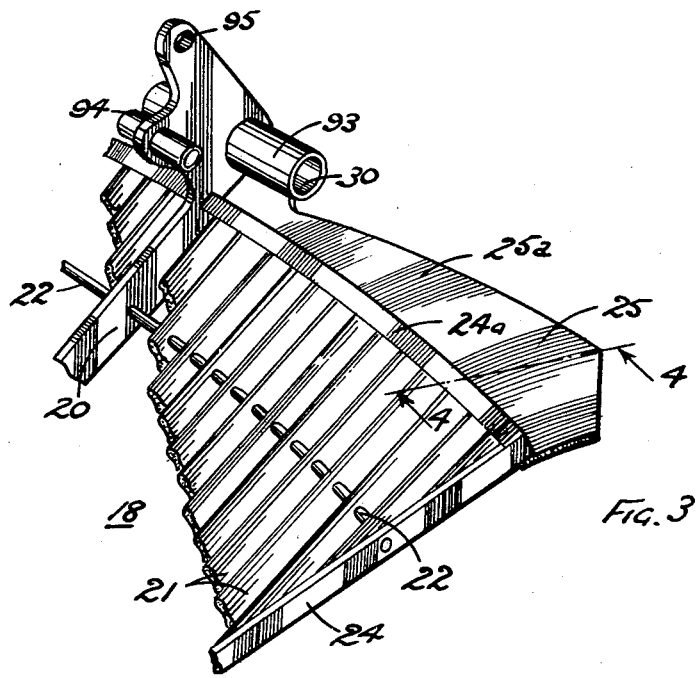
Figure 3 is a fragmentary perspective view of one of the guard sections and of the lever means thereof.

Each of these sections 18 (see Figure 3) consists of a central lever 20 to which is secured a light, angle-section, frame 24 of the appropriate shape carrying a plurality of parallel slats 21, each of aerofoil section, which are secured at their ends to adjacent flanges of the frame by brazing. The lever, slats and side members of the frame are interconnected by tie-rods 22, only one appearing in Figure 3, which are brazed to each of these elements, and the resulting structure is of low aerodynamic drag and is very resistant to impact loads. From Figures 3 and 9 particularly it will be seen that these sections, in the guarding position, constitute a frusto-conical guard.

Figure 4:
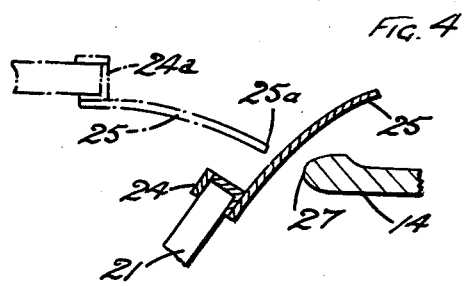
Figure 4 is a fragmentary section, on the line 4—4 of Figure 3, of the outer end of the guard section, showing also in chain lines the section when in the inoperative position.

The radially-outer, downstream end 24a of each section carries two guiding shields 25 (Figures 3 and 4, though only one appears in Figure 3) which can, in the guarding position, direct debris into an annular collecting chamber 26 (Figure 5) hereinafter described in greater detail, at the downstream end of the sections. When moving to the retracted position, the guiding shields can also direct any debris which may have lodged on them into the annular chamber, and prevent any entrapped debris in the collecting chamber from falling back into the compressor entry. For this purpose it is desirable that the gap between a guiding shield and the adjacent edge 27 of the casing 14 forming the inner wall of the collecting chamber 26 should never be greater than the gap between the aerofoil slats 21 as the section is being moved to its retracted position. It will be understood that, in moving from the operative to the retracted position, the end 24a of a section moves away from the edge 27 of the casing 14 due to the pivotal mounting of the section, later described. Without such guiding shields there would be gaps extending between the edge 27 and the edge 24a of a section, these gaps increasing in size from each side of the central lever to the outer corners of the section as it is being retracted. From Figure 4 it will be observed that, in the inoperative position of the section, the shield is substantially aligned with the edge 27 of the casing 14 to provide part of the outer wall of intake duct 11 and substantially to close the aforesaid wider portions of the gaps.

Each of the levers 20 is pivotally mounted on the casing 14 at 30 (see Figure 6 for details of the pivot), and an adjacent part is connected to a spring link 32 (Figure 5) which is just over centre when the section is in the guarding position, and which, it will be observed, will also be over centre (on the other side) when the section is retracted to the inoperative position. When in the inoperative position, the section lies in a recess provided for the purpose in the forward casing portion 33, as shown in Figure 1 at 34.

A pneumatic ram 36 is provided for operating the lever 20 of each section, the movable element 37 of the ram (Figures 5 and 9) being connected with the lever by means of a link 38. All the rams are supplied in parallel from the compressor, as indicated by the arrow 39 in Figure 9, by means of two pipes 40, 41 (Figures 1, 2, 5, 8 and 9) and connecting by-pass pipes 42 round each ram. In consequence, should one or more of the sections become immovable through any cause, operation of the remainder will not be affected.

Figure 9:
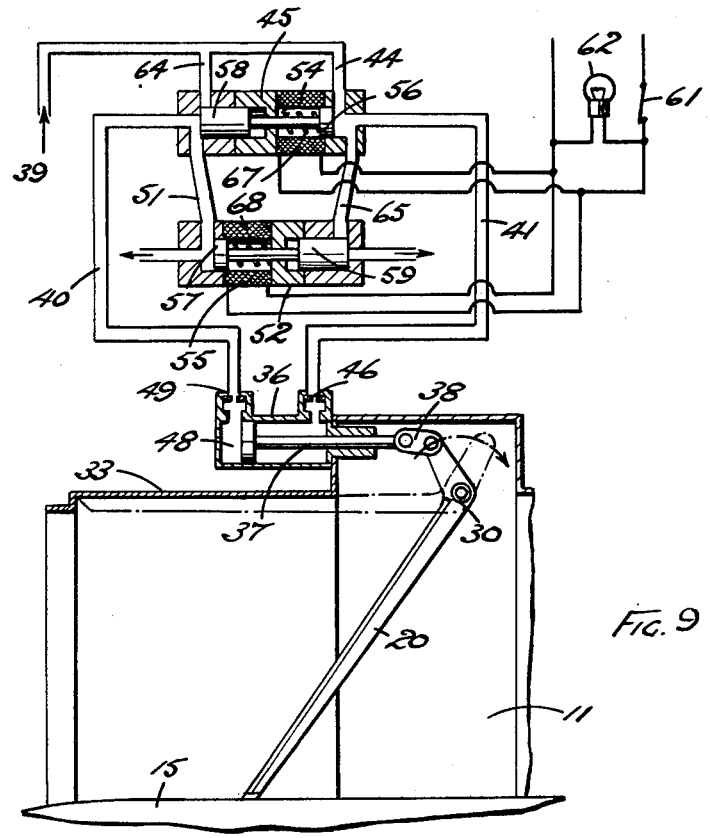
Figure 9 is a diagram showing in full lines the lever means of one of the sections in the guarding position, and showing also the fluid-actuating mechanism, and the controlling valve means.

Referring now to the diagram of Figure 9, dealing with only one of the rams, this shows the compressor pressure as being applied along a pipe line 44, via an electromagnetic valve 45 and the pipe 41, to the right-hand end of the cylinder of the ram, through a restricted passage 46, thus forcing the movable element 37 to the left to initiate the movement of the section towards the guarding position. As soon as the section moves into the airstream, however, the aerodynamic forces will act on the section and will augment the thrust of the ram and tend to accelerate the section to the guarding position shown in full lines. During this movement, air at the left-hand end 48 of the ram is progressively compressed and forced through a restricted passage 49 whence it is exhausted by the pipe 40, the valve 45, a passage 51, and a second electro-magnetic valve 52. Therefore, before the section moves fully into the guarding position, there is a considerable resistance introduced against this tendency to accelerate which serves satisfactorily to slow it down.

It should be noted that the fluid-actuated mechanism is adapted to exert a greater torque on the lever means during retraction of the guard section than during movement to the operative position, in view of the aerodynamic forces acting on the section, by means of the difference in areas of the ram plunger, due to the area of plunger rod.

The valves 45 and 52 each have an energizing coil 54, 55 acting upon a ferrous head 56, 57, respectively, and, at the end opposite the head, another valve member 58, 59. The movement of the sections to the guarding position is therefore effected by closing a switch 61 which operates a warning light 62 and also energises both the coils 54, 55 so that the respective heads 56, 57, being retracted partly into the interiors of the coils, open the adjacent ports as shown in Figure 9, whilst the other valve members 58, 59 close the ports at the ends of the pipe line 64 and passage 65 connecting the two valves. Conversely, opening the switch 61 allows springs 67, 68 to move the respective valve members to their other positions. In such other positions the compressor pressure is supplied along the pipe line 64 and the pipe 40 to the left-hand end of the cylinder of the ram, thus raising the guard section to its inoperative position, the movement of the ram plunger to the right forcing the air, which is being progressively compressed at the right-hand end of the ram cylinder, through the restricted passage 46 into the pipe 41, whence it is exhausted by way of the electro-magnetic valve 45, the passage 65, and the electro-magnetic valve 52.

It will be observed, therefore, that in the event of a break in the electrical supply when the sections are in the operative position, they will be returned to the inoperative positions.

Figure 8:
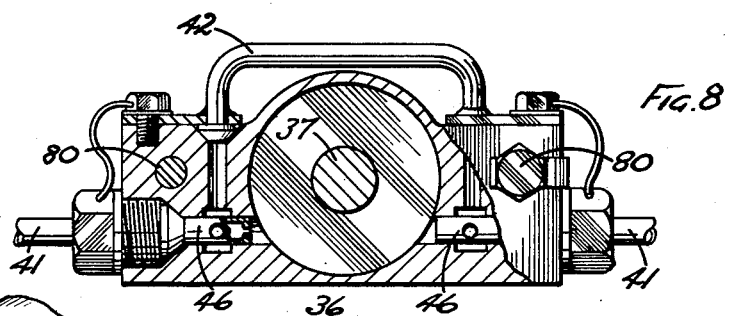
Figure 8 is a cross section, to a still larger scale, taken on the line 8—8 of Figure 5.

It will be understood that, in practice, communication with each end of the ram cylinder will actually take place through a pair of restricted passages in the manner shown at 46 in Figure 8.

Referring now more particularly to Figures 5, 6 and 7, the former shows a section through the annular collecting chamber 26 which is bounded at the front end by an outwardly-extending circumferential flange of the forward casing portion 33 (see Figures 1 and 5) integral with a ring 33a. The casing portion 33 is supported from the rear wall of the annular casing 14 by a number of support brackets each comprising a front plate 74 and a rear plate 75 connected by a pair of channel-section members 76 which are welded thereto. The brackets are attached to the rear wall of the annular casing 14 by the bolts 77. Aligned openings (such as that shown at 78 in Figure 7) are provided in the front plate 74 of the bracket and in the abutting circumferential flange of the casing portion 33 to receive the downstream end 79 of the ram casing, all these parts being secured in position by means of bolts 80 (shown in Figure 8). The end portion 79 of the ram casing also provides a fixed pivotal point 81 for the spring link 32.

The outer periphery of the collecting chamber is formed by a detachable band 86, which is flexible to assist its removal when clearing the collected debris from the annular chamber 26, or for inspection of the guard operating mechanism. To accommodate distorting loads during contraction of the band, it has formed in it axial flutes 87. The band is supported (Figure 5) by the ring 33a at its forward edge and by the flange 98, of the casing 14, at its rear edge. These supports are provided with rubber seals 88 to ensure an air tight contact with the band.

The actual pivotal mounting of each lever 20 is effected by means of a bracket 89, as shown by Figure 6, adapted to be secured by means of screws in the holes 90 to the casing 14. The bracket 89 has fast on it a portion carrying eyes 91 (only one being visible) to receive the pivot pin 31 which is secured by a dowel 92 to a sleeve 93 fast with the outer end of the lever. 94 indicates a mounting for the other end of the spring link, and a hole 95 (Figure 6) is provided for a pivot 96 for the link 38.

What I claim as my invention and desire to secure by Letters Patent of the United States is:

1. For an aircraft engine having an air intake passage and a guarding device for excluding foreign matter from said passage which is reversibly movable between a guarding and a non-guarding position relatively to said passage, an operating mechanism comprising a lever means for actuating said guarding device from either of its said positions to the other, a fluid-actuated mechanism for operating said lever means, means biassing said fluid-actuated mechanism towards a position in which it is set for operating said guarding portion to the non-guarding position, said fluid-actuated mechanism having flow control means acting to brake the movement of said guarding device as the latter approaches the extremity of its travel in either direction, and an electric control means for said fluid-actuated mechanism, the biassing means acting to ensure that said intake passage will automatically become unguarded in the event of a failure in said electrical control means.

2. For an aircraft engine having an air intake passage and a guarding device which is reversibly movable between a guarding and a non-guarding position relatively to said passage, an operating mechanism comprising a lever means for actuating said guarding device from either of its said positions to the other, a pneumatic mechanism for operating said lever means, means biassing said pneumatic mechanism towards a position in which it is set for operating said guarding device to the non-guarding position, said pneumatic mechanism including a reversibly movable piston working in a coacting cylinder and air supply and return lines communicating with said cylinder at each side of said piston, each said line containing a restrictor whereby a back-pressure will be created and act as a brake on the piston as the latter tends to become accelerated due to the effective action of the intake air on said guarding device as said guarding portion approaches the extremity of its travel in either direction, and an electric control means for said pneumatic mechanism, said means biassing said pneumatic mechanism ensuring that said intake passage will automatically become unguarded in the event of a failure in said electric control means.

3. For an aircraft engine having an air intake passage and a guarding device which is pivotally supported from stationary structure to be reversibly movable between a guarding and a non-guarding position relatively to said passage, an operating mechanism comprising a lever means for actuating said guarding device from either of its said positions to the other, a pneumatic mechanism for operating said lever means, means biassing said pneumatic mechanism towards a position in which it is set for operating said guarding device to the non-guarding position, said pneumatic mechanism including a reversibly movable piston working in a coacting cylinder and air supply and return lines communicating with said cylinder at each side of said piston, each said line containing a restrictor whereby a back-pressure will be created and act as a brake on the piston as the latter tends to become accelerated due to the effective action of the intake air on said guarding portion as said guarding portion approaches the extremity of its travel in either direction, a spring-loaded device pivotally connected between said stationary structure and said lever means and adapted as said guarding portion approaches either extremity of travel to move over centre for biassing said guarding portion to complete its movement to the extremity, and an electric control means for said pneumatic mechanism, said means biassing said pneumatic mechanism ensuring that said intake passage will automatically become unguarded in the event of a failure in said electric control means.

References Cited in the file of this patent

UNITED STATES PATENTS

| | | |
|---|---|---|
| 2,117,303 | Dinzl | May 17, 1938 |
| 2,546,153 | DeRemer | Mar. 27, 1951 |
| 2,555,592 | Kelly | June 5, 1951 |
| 2,618,358 | Newcomb | Nov. 19, 1952 |
| 2,652,131 | Kelly | Sept. 15, 1953 |